United States Patent
Ohlrich

(10) Patent No.: US 11,928,228 B2
(45) Date of Patent: Mar. 12, 2024

(54) FACILITATING AN OBJECT PROTOCOL BASED ACCESS OF DATA WITHIN A MULTIPROTOCOL ENVIRONMENT

(71) Applicant: EMC IP Holding Company LLC, Hopkinton, MA (US)

(72) Inventor: Miles Ohlrich, Seattle, WA (US)

(73) Assignee: EMC IP HOLDING COMPANY LLC, Hopkinton, MA (US)

(*) Notice: Subject to any disclaimer, the term of this patent is extended or adjusted under 35 U.S.C. 154(b) by 533 days.

(21) Appl. No.: 17/033,484

(22) Filed: Sep. 25, 2020

(65) Prior Publication Data

US 2022/0100878 A1 Mar. 31, 2022

(51) Int. Cl.
*G06F 21/62* (2013.01)
*G06F 16/16* (2019.01)
*G06F 16/185* (2019.01)
*G06Q 10/10* (2023.01)

(52) U.S. Cl.
CPC ........ *G06F 21/6218* (2013.01); *G06F 16/162* (2019.01); *G06F 16/185* (2019.01); *G06Q 10/10* (2013.01)

(58) Field of Classification Search
CPC .. G06F 21/6218; G06F 16/162; G06F 16/185; G06F 16/164; G06F 16/188; G06Q 10/10
See application file for complete search history.

(56) References Cited

U.S. PATENT DOCUMENTS

| 7,403,984 B2* | 7/2008 | Ellis ................. G05B 19/41865 |
| | | 709/227 |
| 7,647,329 B1* | 1/2010 | Fischman .............. G06F 3/067 |
| | | 707/999.1 |
| 8,510,265 B1* | 8/2013 | Boone ................ G06F 16/1827 |
| | | 707/790 |

(Continued)

FOREIGN PATENT DOCUMENTS

| CN | 106484820 A | * | 3/2017 | ........... G06F 16/172 |
| CN | 106534249 A | * | 3/2017 | |

(Continued)

OTHER PUBLICATIONS https://docs.aws.amazon.com/cli/latest/reference/fsx/create-data-repository-association.html (Year: 2023).*

(Continued)

*Primary Examiner* — Shahriar Zarrineh
(74) *Attorney, Agent, or Firm* — Amin, Turocy & Watson, LLP

(57) ABSTRACT

Facilitating an object protocol based access of data within a multiprotocol environment is presented herein. In response to receiving a simple storage system (S3) protocol based request to access data via a storage device of a filesystem, the filesystem determines a type of S3 bucket that represents the data; and based on the type of S3 bucket, the filesystem facilitates an S3 protocol based access of the data via the storage device. For example, the S3 protocol based request comprises a file request to create, read, write, and/or delete a file within the storage device. In another example, the S3

(Continued)

protocol based request comprises an object request to create, modify, read, and/or delete an object within the storage device.

20 Claims, 10 Drawing Sheets

(56) References Cited

U.S. PATENT DOCUMENTS

| | | | | | |
|---|---|---|---|---|---|
| 8,650,166 | B1* | 2/2014 | Cook | ............... | G06F 16/164 |
| | | | | | 707/694 |
| 9,773,012 | B2* | 9/2017 | Cutforth | ............... | G06F 3/067 |
| 10,152,239 | B1* | 12/2018 | Tamilmani | ............... | G06F 11/1448 |
| 10,817,203 | B1* | 10/2020 | Anand | ............... | G06F 3/0647 |
| 10,885,007 | B2* | 1/2021 | Bhagwat | ............... | G06F 16/2465 |
| 11,095,706 | B1* | 8/2021 | Ankam | ............... | H04L 67/025 |
| 11,171,950 | B1* | 11/2021 | Zhuravlev | ............... | H04L 67/141 |
| 11,392,578 | B1* | 7/2022 | James | ............... | G06F 16/24573 |
| 2007/0156842 | A1* | 7/2007 | Vermeulen | ............... | G06F 16/184 |
| | | | | | 709/217 |
| 2018/0084052 | A1* | 3/2018 | Trachy | ............... | H04L 67/1097 |
| 2018/0121503 | A1* | 5/2018 | Bakke | ............... | G06F 16/2246 |
| 2018/0205791 | A1* | 7/2018 | Frank | ............... | G06F 16/219 |
| 2019/0286717 | A1* | 9/2019 | Mattankot | ............... | G06F 16/13 |
| 2019/0384495 | A1* | 12/2019 | Balcha | ............... | G06F 3/0619 |
| 2020/0007615 | A1* | 1/2020 | Brebner | ............... | G06F 9/542 |
| 2020/0174671 | A1* | 6/2020 | Margaglia | ............... | G06F 3/065 |
| 2020/0356536 | A1* | 11/2020 | Nilsson | ............... | G06F 16/122 |
| 2020/0401313 | A1* | 12/2020 | Cheru | ............... | G06F 3/0614 |
| 2021/0019063 | A1* | 1/2021 | Lee | ............... | G06F 3/0637 |
| 2021/0055885 | A1* | 2/2021 | Strathman | ............... | G06F 3/0665 |
| 2021/0176315 | A1* | 6/2021 | Seurynck | ............... | G06F 3/0604 |
| 2021/0349859 | A1* | 11/2021 | Bafna | ............... | G06F 3/067 |

FOREIGN PATENT DOCUMENTS

| | | | | | |
|---|---|---|---|---|---|
| CN | 110765095 | A | * | 2/2020 | |
| CN | 111159105 | A | * | 5/2020 | ............... G06F 16/13 |
| CN | 111309259 | A | * | 6/2020 | |
| CN | 111324799 | A | * | 6/2020 | ............... G06F 16/953 |
| CN | 111708738 | A | * | 9/2020 | |
| CN | 112187589 | A | * | 1/2021 | ............... H04L 43/0876 |
| CN | 113111033 | A | * | 7/2021 | ............... G06F 16/137 |
| CN | 113253938 | A | * | 8/2021 | |
| CN | 113568566 | A | * | 10/2021 | ............... G06F 16/215 |
| CN | 110781152 | B | * | 4/2022 | ............... G06F 16/113 |
| CN | 111444020 | B | * | 7/2022 | ............... G06F 16/182 |
| CN | 114741441 | A | * | 7/2022 | |
| CN | 114968937 | A | * | 8/2022 | |
| CN | 115438016 | A | * | 12/2022 | |
| CN | 115563071 | A | * | 1/2023 | |
| CN | 116107520 | A | * | 5/2023 | |
| DE | 102012111181 | A1 | * | 5/2014 | ............... G06F 16/13 |
| DE | 112019000136 | T5 | * | 7/2020 | ............... G06F 11/2094 |
| WO | WO-2019178890 | A1 | * | 9/2019 | ............... G06F 12/0891 |
| WO | WO-2021072881 | A1 | * | 4/2021 | |

OTHER PUBLICATIONS

Amazon.com, What is Amazon S3 File Gateway—AWS Storage Gateway (Year: 2023).*
Linking your file system to an S3 bucket—FSx for Lustre (amazon.com) (Year: 2023).*
Seagate.com, How Amazon S3 Buckets Work | Seagate US (Year: 2023).*
Amazon web services—bucket policy vs iam policy which one takes the precedence—Server Fault (Year: 2023).*
Amazon.com, Overview of managing access—Amazon Simple Storage Service (Year: 2023).*
Amazon.com, Access control best practices—Amazon Simple Storage Service (Year: 2023).*
Amazon.com, FSx for Lustre—Lustre User Guide (amazon.com) (Year: 2023).*
"Fully migrate from Amazon S3 to Cloud Storage" Google Cloud. [https://cloud.google.com/storage/docs/migrating] retrieved Oct. 1, 2022, 8 pages.
"Access Control Lists on Dell EMC PowerScale OneFS" Dell Technologies. Dec. 2021. [https://www.dellemc.com/resources/en-us/asset/white-papers/products/storage/h17431_wp_access_control_lists_on_dell_emc_isilon_onefs.pdf], retrieved Oct. 1, 2022, 57 pages.
"Signature Version 2 signing process" AWS [https://docs.aws.amazon.com/general/latest/gr/signature-version-2.html] retrieved Oct. 1, 2022, 11 pages.
"Signature Version 4 signing process" AWS [https://docs.aws.amazon.com/general/latest/gr/signature-version-4.html] retrieved Oct. 1, 2022, 2 pages.
"AwsSignatureVersion4" GitHub. [https://github.com/FantasticFiasco/aws-signature-version-4] retrieved Oct. 1, 2022, 8 pages.
"Signature Calculations for the Authorization Header: Transferring Payload in a Single Chunk (AWS Signature Version 4)" [https://docs.aws.amazon.com/AmazonS3/latest/API/sig-v4-header-based-auth.html] retrieved Oct. 1, 2022, 18 pages.
Hill, Marshall. "The Storage Protocol Wars" [https://www.lookingpoint.com/blog/storage-protocol] retrieved Aug. 30, 2020, 10 pages.

* cited by examiner

| MAP FILE 310 | | |
|---|---|---|
| BUCKET NAME | BUCKET TYPE | DIRECTORY PATH WITHIN FILESYSTEM |
| BUCKET_IDENTIFIER_0 | OBJECT BUCKET | /BUCKET_ROOT_DIRECTORY/BUCKET_IDENTIFIER_0/ |
| BUCKET_IDENTIFIER_1 | OVERLAY BUCKET | /DIRECTORY/PATH/1/ |
| ... | | |
| BUCKET_IDENTIFIER_N | OVERLAY BUCKET | /ANOTHER/DIRECTORY/PATH/ |

FIG. 3

FACILITATING AN OBJECT PROTOCOL BASED ACCESS OF DATA WITHIN A MULTIPROTOCOL ENVIRONMENT

TECHNICAL FIELD

The subject disclosure generally relates to embodiments for facilitating an object protocol based access of data within a multiprotocol environment.

BACKGROUND

Object storage systems facilitate access of objects within an object storage device utilizing an object storage protocol. Conversely, filesystems, file systems, etc. facilitate access of files within a file storage device using a file storage protocol. In this regard, conventional storage technologies do not facilitate access of existing files within a filesystem using an object storage protocol. Consequently, conventional storage technologies have had some drawbacks, some of which may be noted with reference to the various embodiments described herein below.

BRIEF DESCRIPTION OF THE DRAWINGS

Non-limiting embodiments of the subject disclosure are described with reference to the following figures, wherein like reference numerals refer to like parts throughout the various views unless otherwise specified:

FIG. 3 illustrates a block diagram of a map file, in accordance with various example embodiments;

DETAILED DESCRIPTION

Figure 1:
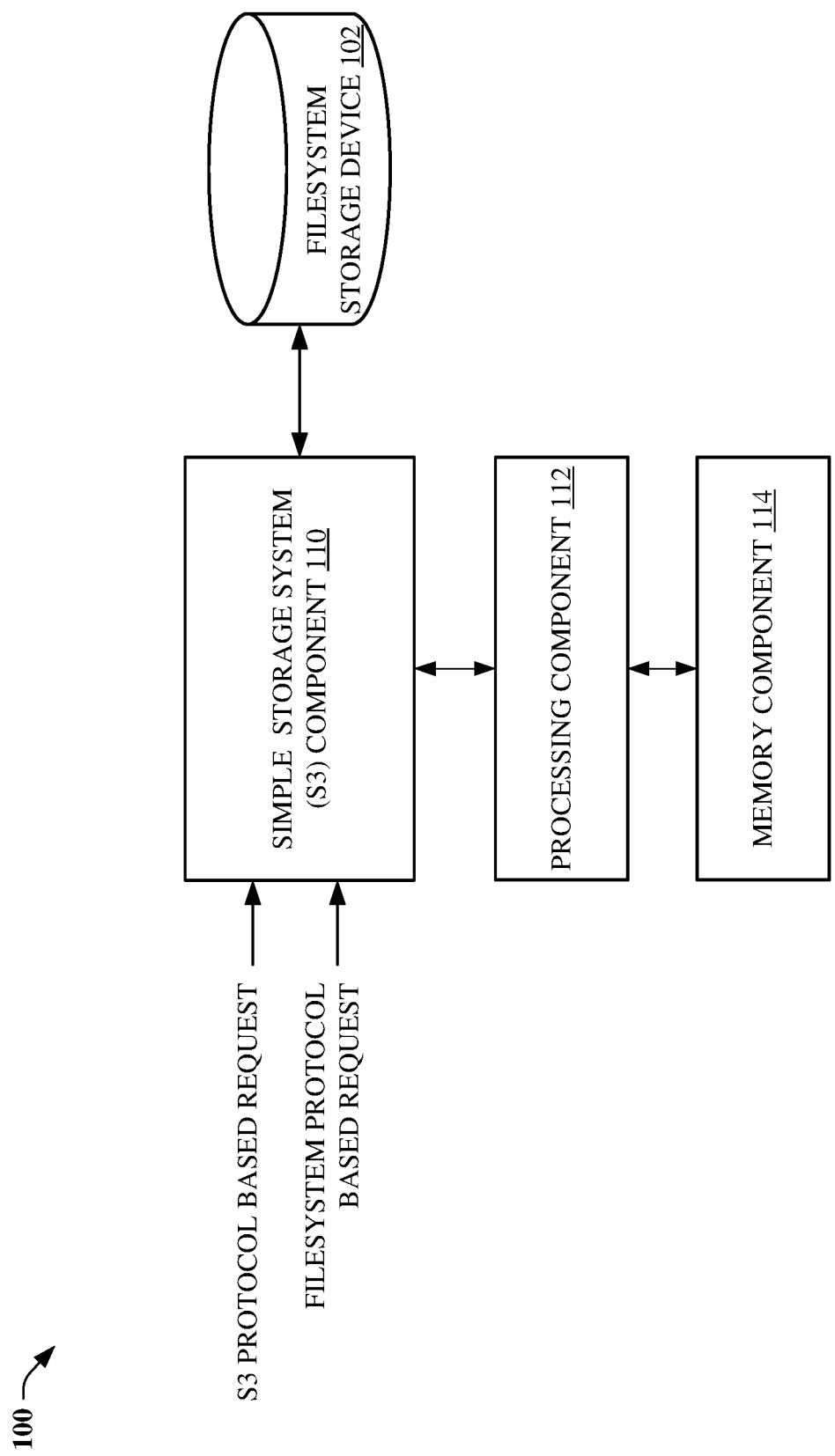
FIG. 1 illustrates a block diagram of a system comprising a simple storage system (S3) component that facilitates S3 protocol based access of existing files of a filesystem and S3 protocol based objects that have been stored in the filesystem, in accordance with various example embodiments.

Aspects of the subject disclosure will now be described more fully hereinafter with reference to the accompanying drawings in which example embodiments are shown. In the following description, for purposes of explanation, numerous specific details are set forth in order to provide a thorough understanding of the various embodiments. However, the subject disclosure may be embodied in many different forms and should not be construed as limited to the example embodiments set forth herein.

As described above, conventional storage technologies have had some drawbacks with respect to facilitating access of files within a filesystem using an object storage protocol. On the other hand, various embodiments disclosed herein can facilitate an access of a file and/or object within a file system using an object storage protocol by referencing the file or the object using different types of object buckets that correspond to respective directory paths of the filesystem.

For example, a system, e.g., a filesystem, a Dell EMC® Isilon file storage system, etc. can comprise a processor; and a memory that stores executable components that, when executed by the processor, facilitate performance of operations by the system, the executable components comprising: a simple storage system (S3) component comprising an overlay bucket component, an object bucket component, and an access authorization component.

The S3 component receives an S3 protocol based request to access data, e.g., a file, an object, etc. via a storage device of the filesystem.

In embodiment(s), the S3 protocol based request comprises a file request to create the file within the storage device of the filesystem, read the file within the storage device of the filesystem, write the file within the storage device of the filesystem, or delete the file within the storage device of the filesystem.

In other embodiment(s), the S3 protocol based request comprises an object request to create an object, e.g., S3 protocol based object, within the storage device of the file system, modify the object within the storage device of the filesystem, read the object within the storage device of the filesystem, or delete the object within the storage device of the filesystem.

In turn, based on the S3 protocol based request, the S3 component determines, using a map file, data structure, etc. a type of S3 bucket that represents the data.

In embodiment(s), the S3 protocol based request specifies a bucket name, identifier, etc. that references a directory path of a location of the S3 bucket within the storage device of the file system, and the determining of the type of S3 bucket comprises determining, based on the bucket name, identifier, etc. via the map file, whether the data is referenced via an object bucket or an overlay bucket—the map file designating, mapping, etc. the bucket name, identifier, etc. to the directory path of the location of the S3 bucket within the storage device of the filesystem.

The object bucket is created, via the object bucket component, in a subdirectory of a bucket root directory of the storage device of the filesystem and comprises an S3 protocol based object comprising the data. The overlay bucket is aliased, via the overlay bucket component, to a directory path of an existing directory of the storage device of the filesystem comprising a file that includes the data. In this regard, the S3 protocol based request comprises, specifies, etc. a pseudo object that references the directory path of the existing directory to facilitate an S3 protocol based access, via the overlay bucket component using the pseudo object, of the file. In one embodiment, the S3 protocol based request further specifies, comprises, etc. the directory path of the existing directory comprising the file.

In turn, the S3 component facilitates, based on the type of S3 bucket, an S3 protocol based access of the data via the storage device of the filesystem. In this regard, in an embodiment, S3 component facilitates, via the access authorization component, the S3 protocol based access, via the overlay bucket, of the data based on an S3 protocol based permission and a filesystem protocol based permission.

In another embodiment, the S3 protocol based access comprises a removal, via the overlay bucket component, of the overlay bucket. Further, in response to the removal of the overlay bucket, no files comprising the file are removed from the storage device of the filesystem.

In yet another embodiment, the S3 component facilitates, via the access authorization component, the S3 protocol based access, via the object bucket, of the data based only on an S3 protocol based permission without consideration of any filesystem based permission.

In an embodiment, the S3 protocol based access comprises a removal, via the object bucket component, of the object bucket. In this regard, the removal of the object bucket is denied, via the access authorization component, in response to a determination that the subdirectory of the bucket root directory comprises an object.

In embodiment(s), the S3 protocol based object is accessible, via a filesystem protocol, via the bucket root directory and an identifier, e.g., object name, of the S3 protocol based object.

In other embodiment(s), a method comprises: receiving, by a filesystem comprising a processor, an S3 protocol based request to access information that has been stored within a directory path of a storage device of the filesystem; determining, by the filesystem, a type of S3 bucket representing the information; and facilitating, by the filesystem based on the type of S3 bucket representing the information, an S3 protocol based access of the information.

In an embodiment, the determining of the type of S3 bucket comprises: generating a map file representing, via a bucket identifier, whether the information has been represented by an overlay bucket or an object bucket and referencing, via the bucket identifier, a directory within the storage device comprising a location of the S3 bucket, wherein the overlay bucket is aliased to an existing filesystem path of a file comprising the information, wherein the object bucket is created in a subdirectory of a bucket root directory of the filesystem, and wherein the subdirectory comprises an S3 protocol based object comprising the information.

In another embodiment, the facilitating of the S3 protocol based access of the information comprises: in response to the information being determined, via the map file using the bucket identifier, to be represented by the overlay bucket, facilitating, based on a filesystem protocol based permission and an S3 protocol based permission via a pseudo object identifier that has been included in the S3 protocol based request and that references the existing filesystem path of the file, an access of the file comprising at least one of a write of the file, a read of the file, or a deletion of the file.

In yet another embodiment, the facilitating of the S3 protocol based access of the information comprises: in response to the information being determined, via the map file using the bucket identifier, to be represented by the object bucket, facilitating, based on an S3 protocol based permission via the subdirectory of the bucket root directory of the filesystem, an access of the S3 protocol based object comprising at least one of a creation of the S3 protocol based object, a modification of the S3 protocol based object, a read of the S3 protocol based object, or a deletion of the S3 protocol based object .

In an embodiment, the operations further comprise: facilitating, by the filesystem via a filesystem protocol via the subdirectory of the bucket root directory and a name, an identifier, etc. of the S3 protocol based object, a filesystem protocol based access of the S3 protocol based object.

One embodiment comprises a non-transitory machine-readable medium comprising instructions that, in response to execution, cause a system comprising a processor to perform operations, the operations comprising: receiving, via an S3 protocol, a request to access data of a filesystem; based on the request, determining whether the data has been referenced by an object bucket or an overlay bucket; and in response to the determining, facilitating, via the object bucket or the overlay bucket, the access of the of the filesystem.

In an embodiment, the determining comprises: determining whether the data has been referenced by the object bucket or the overlay bucket utilizing a data structure representing directories of the filesystem where respective data comprising the data are located and representing whether the data has been referenced by the object bucket or the overlay bucket. In this regard, the overlay bucket comprises a pseudo object identifier that references an existing filesystem path of a file comprising the data. Further, the object bucket is created under a subdirectory of a bucket root directory of the filesystem and comprises an S3 protocol based object comprising the data.

In one embodiment, the facilitating of the access comprises: facilitating the access via the object bucket based on an S3 protocol based permission, without consideration of any filesystem protocol based permissions of the filesystem; and facilitating the access via the overlay bucket based on the S3 protocol based permission and a filesystem protocol based permission of the filesystem.

As described above, conventional storage technologies have had some drawbacks with respect to facilitating an object storage protocol based access of a file within a filesystem. On the other hand, various embodiments disclosed herein can facilitate such access by referencing the file using an overlay bucket corresponding to a directory path of the file.

Referring now to FIG. 1, a system (100) comprising an S3 component (110) can comprise a filesystem storage device (102), a processing component (112), and a memory component (114). In embodiment(s), the system can comprise a distributed file system, an ECS system, a parallel distributed networked file system, a OneFS™ file system provided by Dell EMC® Isilon Systems (e.g., utilizing a FreeBSD based operating system), etc. In various embodiment(s), the distributed file system can comprise a host server, a client server, etc. In other embodiment(s), various components of the distributed file system can be included in a host application, a client application, storage/data services, etc.

Figure 9:
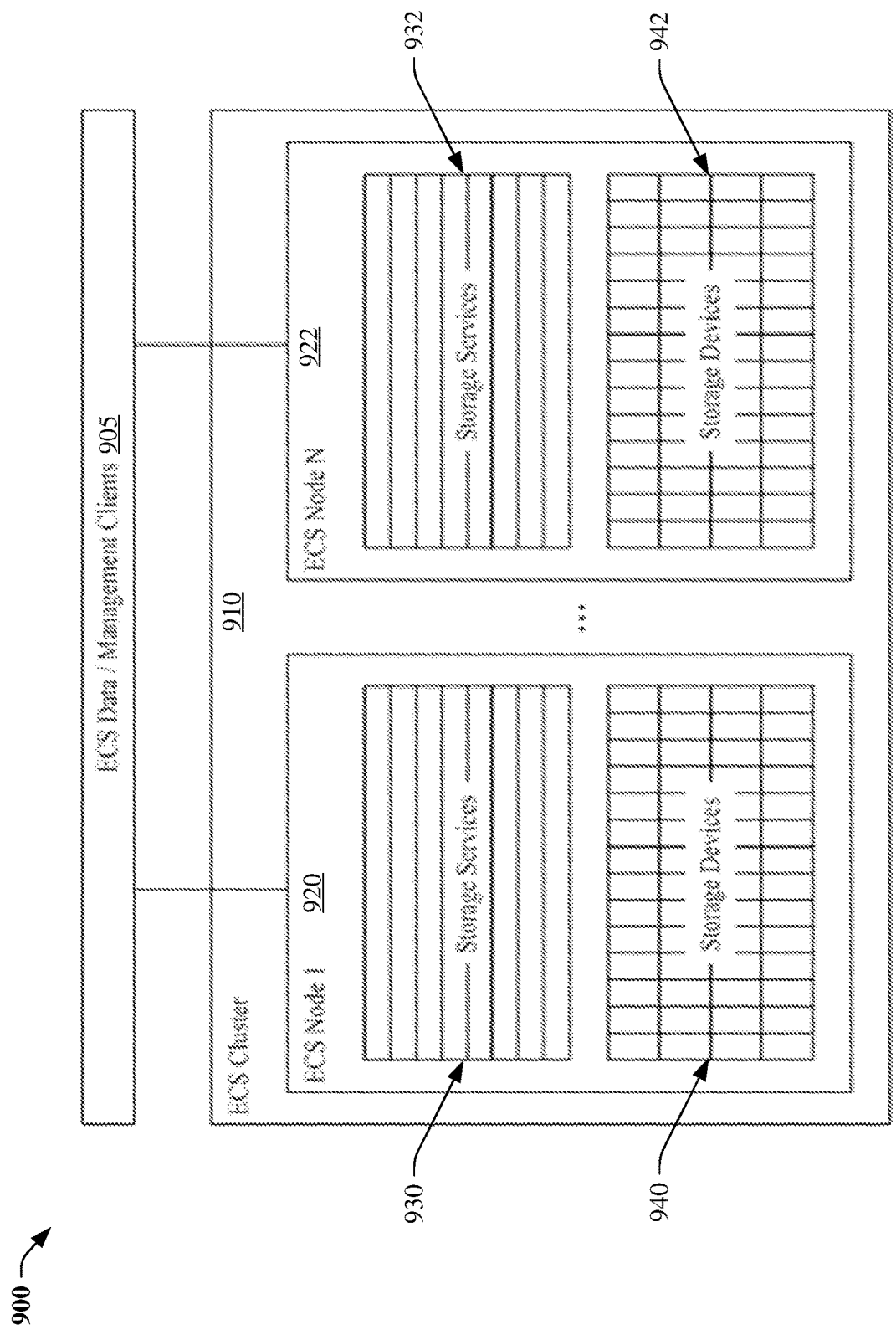
FIG. 9 illustrates a block diagram of an elastic cloud storage (ECS) system, in accordance with various example embodiments.

In this regard, and now referring to FIG. 9, a Dell EMC® Isilon file storage system (900) can comprise a cloud-based object storage appliance (e.g., comprising storage control software, components (e.g., 110, 112, 114, 210, 220, 230, etc.); ECS data clients/management clients (905); storage services (930, 932) and storage devices (102, 940, 942) (e.g., comprising storage media, physical magnetic disk media, solid-state drive (SSD) media, e.g., flash storage, etc.) of a storage cluster (910). In this regard, the cloud-based object storage appliance is a type of clustered file system that spreads data across multiple storage nodes (920, 922), e.g., usually for redundancy or performance. Further, such clustered file system can simultaneously be mounted on multiple file servers (not shown), e.g., OneFS™ clusters, and can provide features like location-independent addressing and redundancy which can improve reliability and/or reduce the complexity of portion(s) of a cluster, e.g., storage cluster, data storage cluster, data cluster, etc.

As illustrated by FIG. 9, the storage service(s) and storage device(s) can be included in respective data storage nodes (920, 922) of clusters (910), e.g., storage clusters, data storage clusters, data clusters, etc., e.g., combined as an integrated system—with no access to the storage devices other than through the Dell EMC® Isilon file storage system. In this regard, the respective nodes, storage nodes, data storage nodes, etc. can be communicatively and/or operatively coupled to each other, with the storage service(s) comprising respective processes, processing jobs, job worker processes, applications, etc. that can be utilized to service user requests according to user-based storage policies.

In general, the respective data storage nodes can communicate with user devices via wired and/or wireless communication network(s) to provide access to services that are based in the cloud and not stored locally (e.g., on a user device). A typical cloud-computing environment can include multiple layers, aggregated together, which interact with each other to provide resources for end-users.

The Dell EMC® Isilon file storage system can support storage, manipulation, and/or analysis of unstructured data on a massive scale on commodity hardware. As an example, the Dell EMC® Isilon file storage system can support mobile, cloud, big data, and/or social networking applications. In another example, the Dell EMC® Isilon file storage system can be deployed as a turnkey storage appliance, or as a software product that can be installed on a set of qualified commodity servers and disks, e.g., within a node, data storage node, ECS node, etc. of a cluster, data storage cluster, ECS cluster, etc. In this regard, the Dell EMC® Isilon file storage system can comprise a cloud platform that comprises at least the following features: (i) lower cost than public clouds; (ii) unmatched combination of storage efficiency and data access; (iii) anywhere read/write access with strong consistency that simplifies application development; (iv) no single point of failure to increase availability and performance; (v) universal accessibility that eliminates storage silos and inefficient extract, transform, load (ETL)/data movement processes; etc.

In embodiment(s), the Dell EMC® Isilon file storage system can write all object-related data, e.g., user data, metadata, object location data, etc. to logical containers, e.g., buckets, etc. of contiguous disk space, e.g., such containers comprising a group of blocks of fixed size (e.g., 128 MB) known as chunks. Data is stored in the chunks and the chunks can be shared, e.g., one chunk can comprise data fragments of different user objects. Chunk content is modified in append-only mode, e.g., such content being protected from being erased or overwritten for a specified retention period. When a chunk becomes full enough, it is sealed and/or closed—becoming immutable, e.g., read-only and delete only.

Further, a storage node (920, 922) of the cluster can comprise a system (100), a server, a file system, an image of the OS, data service(s), computer processing unit(s) (CPU(s)), storage devices (e.g., non-volatile memory devices, disk drives, solid-state drives, etc.), memory devices, (e.g., volatile memory devices, random access memory, etc.

Figure 2:
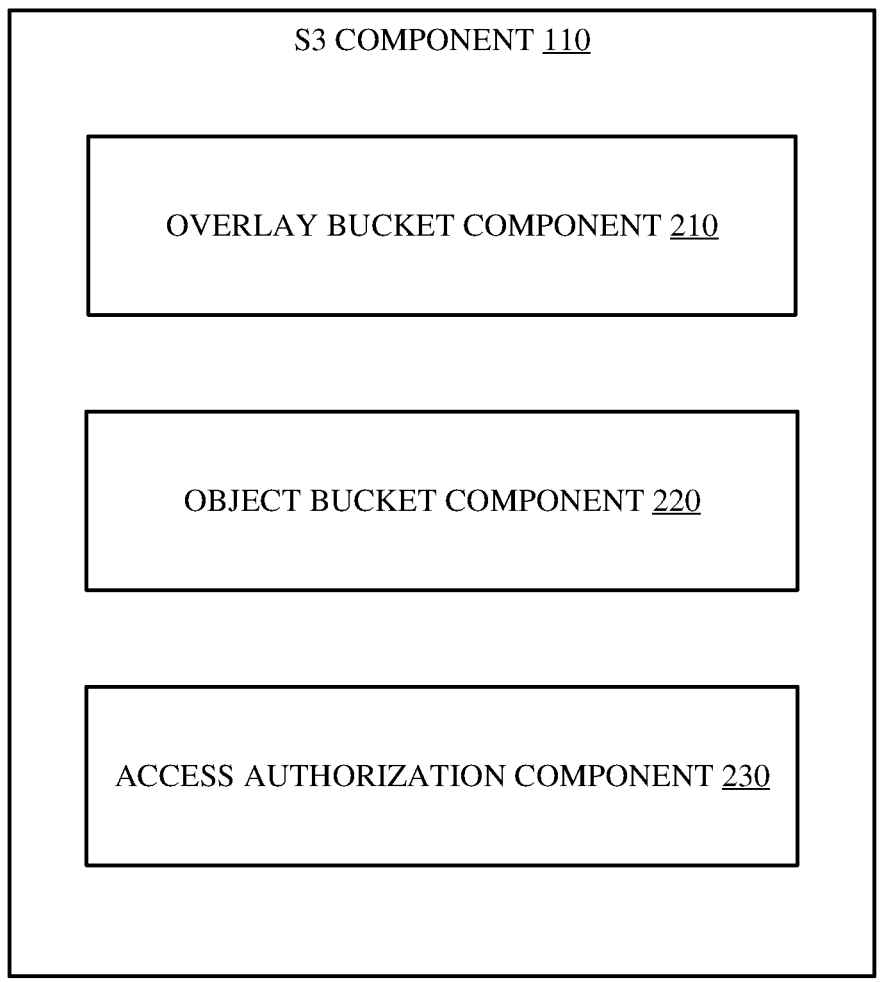
FIG. 2 illustrates a block diagram of an S3 component, in accordance with various example embodiments.

Referring now to FIGS. 2 and 3, the S3 component (110) comprises an overlay bucket component (210), an object bucket component (220), and an access authorization component (230). The S3 component receives an S3 protocol based request or a filesystem protocol based request to access data via the filesystem storage device (102).

In embodiment(s), the S3 protocol based request comprises a file request to create a file within the filesystem storage device, read the file within the filesystem storage device, write the file within the filesystem storage device, or delete the file within the filesystem storage device.

In other embodiment(s), the S3 protocol based request comprises an object request to create an object, e.g., S3 protocol based object, within the filesystem storage device, modify the object within the filesystem storage device, read the object within the filesystem storage device, or delete the object within the filesystem storage device.

In turn, based on the S3 protocol based request, the S3 component determines, using a map file, data structure, etc. (e.g., map file 310) a type of S3 bucket that represents the data.

In embodiment(s), the S3 protocol based request specifies a bucket name, identifier, etc. that references a directory path of a location of the S3 bucket within the filesystem storage device, and the determining of the type of S3 bucket comprises determining, based on the bucket name, identifier, etc. via the map file, whether the data is referenced via an object bucket or an overlay bucket—the map file designating, mapping, etc. the bucket name, identifier, etc. to the directory path of the location of the S3 bucket within the filesystem storage device.

In embodiment(s), the object bucket is created, via the object bucket component, in a subdirectory of a bucket root directory, e.g., "/BUCKET_ROOT_DIRECTORY/BUCKET_IDENTIFIER_0/", of the filesystem storage device, and comprises an S3 protocol based object comprising the data. Further, the overlay bucket is aliased, via the overlay bucket component, to a directory path of an existing directory of the filesystem storage device—the existing directory comprising a file that includes the data.

In this regard, the S3 protocol based request comprises, specifies, etc. a pseudo object that references the directory path of the existing directory to facilitate an S3 protocol based access, via the overlay bucket component using the pseudo object, of the file. In one embodiment, the S3 protocol based request further specifies, comprises, etc. the directory path of the existing directory comprising the file, e.g., "/DIRECTORY/PATH/1", "/ANOTHER/DIRECTORY/PATH/", etc.

In embodiment(s), the overlay bucket acts as way for S3 to access a pre-existing filesystem structure without the ability to compromise any existing permission infrastructure. The owner of the bucket can add additional restrictions on top of the filesystem access checks by using S3 bucket access control lists (ACLs) and policies.

In other embodiment(s), the object bucket acts as a way for an S3 bucket owner to create space for a purer, object-like experience in which the S3 ACLs and polices applied by the bucket owner will override filesystem permissions on any directories that are mapped internally to the object bucket. In this regard, for the object bucket, S3 authorization takes precedence over directory permissions applied by other protocols. Because the object bucket is originally created on top of a new, empty directory, there are no existing file system permissions that need to be taken into account, and so a more permissive policy of allowing S3 to override other protocols is less problematic.

In turn, the S3 component facilitates, based on the type of S3 bucket, an S3 protocol based access of the data via the filesystem storage device. In this regard, in an embodiment, S3 component facilitates, via the access authorization component, the S3 protocol based access, via the overlay bucket, of the data based on an S3 protocol based permission and a filesystem protocol based permission.

In another embodiment, the S3 protocol based access comprises a removal, via the overlay bucket component, of the overlay bucket. Further, in response to the removal of the overlay bucket, no files comprising the file are removed from the filesystem storage device.

In yet another embodiment, the S3 component facilitates, via the access authorization component, the S3 protocol based access, via the object bucket, of the data based only on an S3 protocol based permission without consideration of any filesystem based permission.

In an embodiment, the S3 protocol based access comprises a removal, via the object bucket component, of the object bucket. In this regard, the removal of the object bucket is denied, via the access authorization component, in response to a determination that the subdirectory of the bucket root directory comprises an object.

In embodiment(s), the S3 protocol based object is accessible, via a filesystem protocol, via the bucket root directory and an identifier, e.g., object name, of the S3 protocol based object.

FIGS. 4-8 illustrate methodologies for facilitating an object protocol based access of data within a multiprotocol environment, in accordance with various example embodiments. For simplicity of explanation, the methodologies are depicted and described as a series of acts. It is to be understood and appreciated that various embodiments disclosed herein are not limited by the acts illustrated and/or by the order of acts. For example, acts can occur in various orders and/or concurrently, and with other acts not presented or described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 4:
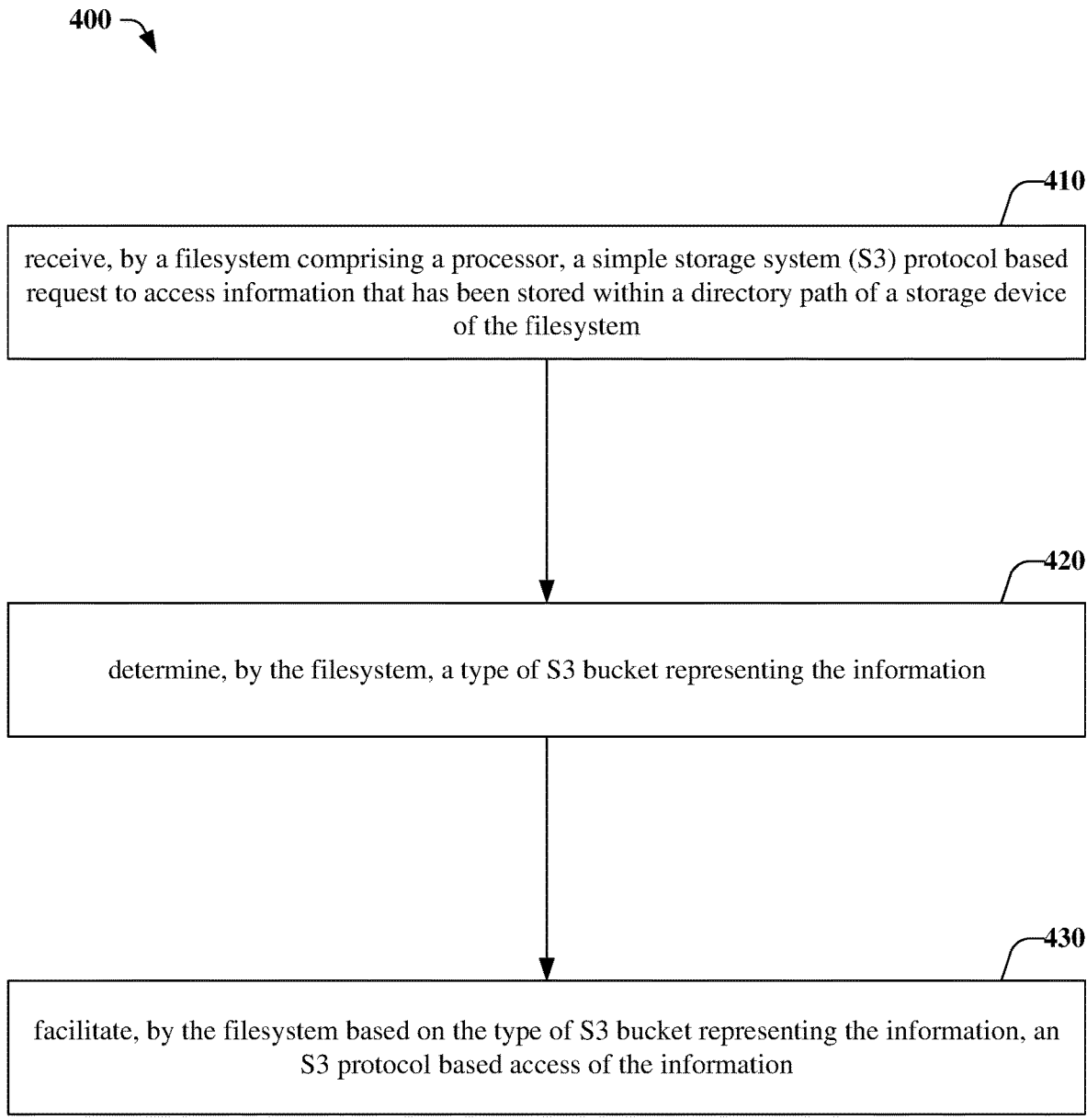
FIG. 4 illustrates a flow chart of a method that facilitates an S3 protocol based access of information that has been stored within a directory path of a storage device of a filesystem based on a type of S3 bucket representing the information, in accordance with various example embodiments.

Referring now to FIG. 4, a flow chart (400) of a method that facilitates an S3 protocol based access of information that has been stored within a directory path of a storage device of a filesystem based on a type of S3 bucket representing the information is illustrated, in accordance with various example embodiments.

At 410, a filesystem (e.g., 100) comprising a processor receives an S3 protocol based request to access information, e.g., a file, an object (e.g., S3 protocol based object), etc. that has been stored within a directory path of a storage device of the filesystem. At 420, the filesystem determines a type of S3 bucket representing the information. At 430, the filesystem facilitates, based on the type of S3 bucket representing the information, an S3 protocol based access of the information.

Figure 5:
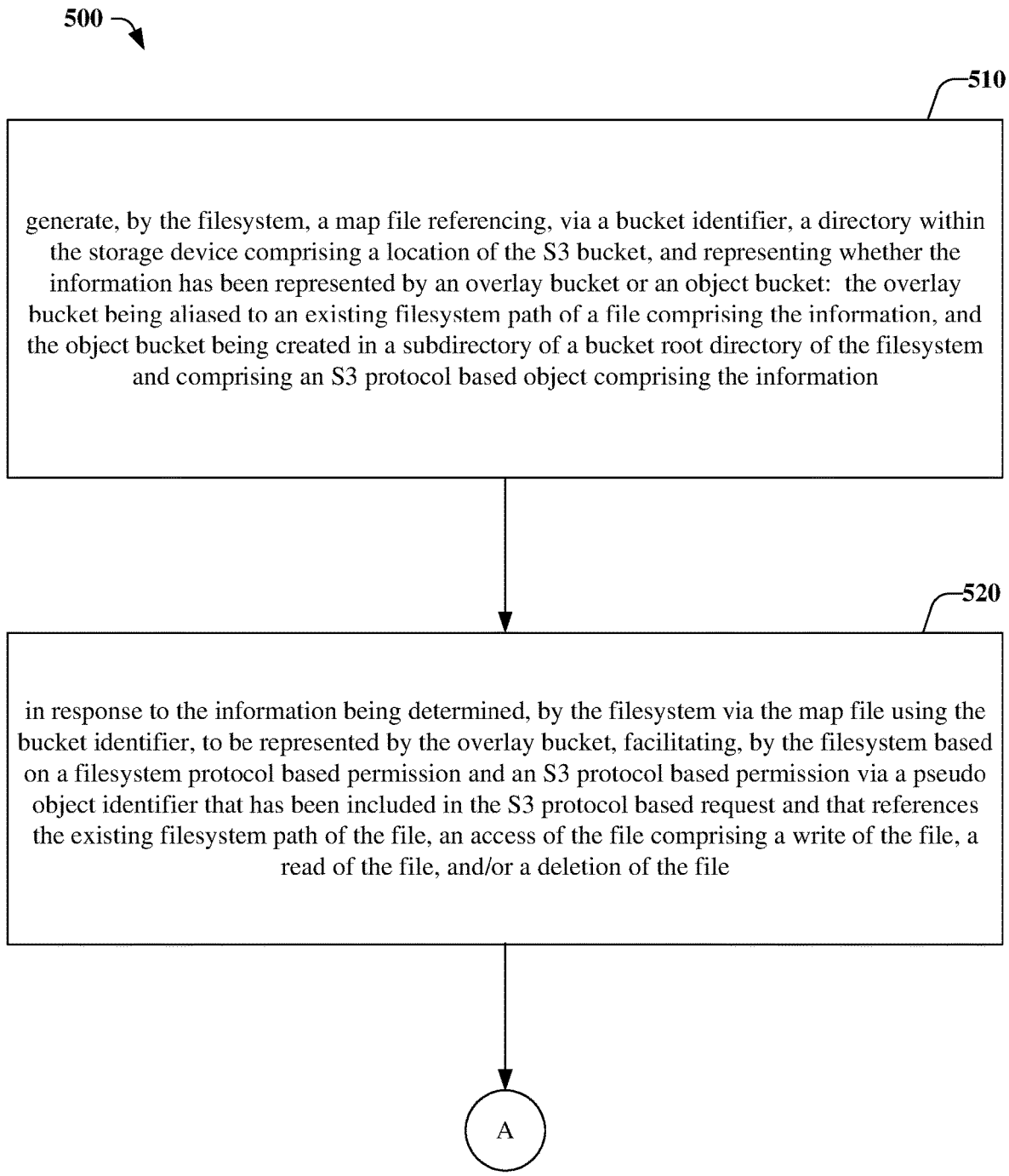
FIG. 5 illustrates a flow chart of a method that facilitates, via a map file using a bucket identifier, an access of a file that has been stored in a storage device of a filesystem, in accordance with various example embodiments.

FIG. 5 illustrates a flow chart (500) of a method that facilitates, via a map file, data structure, etc. using a bucket identifier, an access of the file that has been stored within the directory path of the storage device of the filesystem, in accordance with various example embodiments. At 510, the filesystem generates the map file, data structure, etc. referencing, via a bucket identifier, a directory within the storage device comprising a location of the S3 bucket, and representing whether the information has been represented by an overlay bucket or an object bucket: the overlay bucket being aliased to an existing filesystem path of a file comprising the information; and the object bucket being created in a subdirectory of a bucket root directory of the filesystem and comprising the S3 protocol based object comprising the information.

At 520, in response to the information being determined, by the filesystem via the map file using the bucket identifier, to be represented by the overlay bucket, the filesystem facilitates, based on a filesystem protocol based permission and an S3 protocol based permission via a pseudo object identifier that has been included in the S3 protocol based request and that references the existing filesystem path of the file, an access of the file comprising a write of the file, a read of the file, and/or a deletion of the file.

Figure 6:
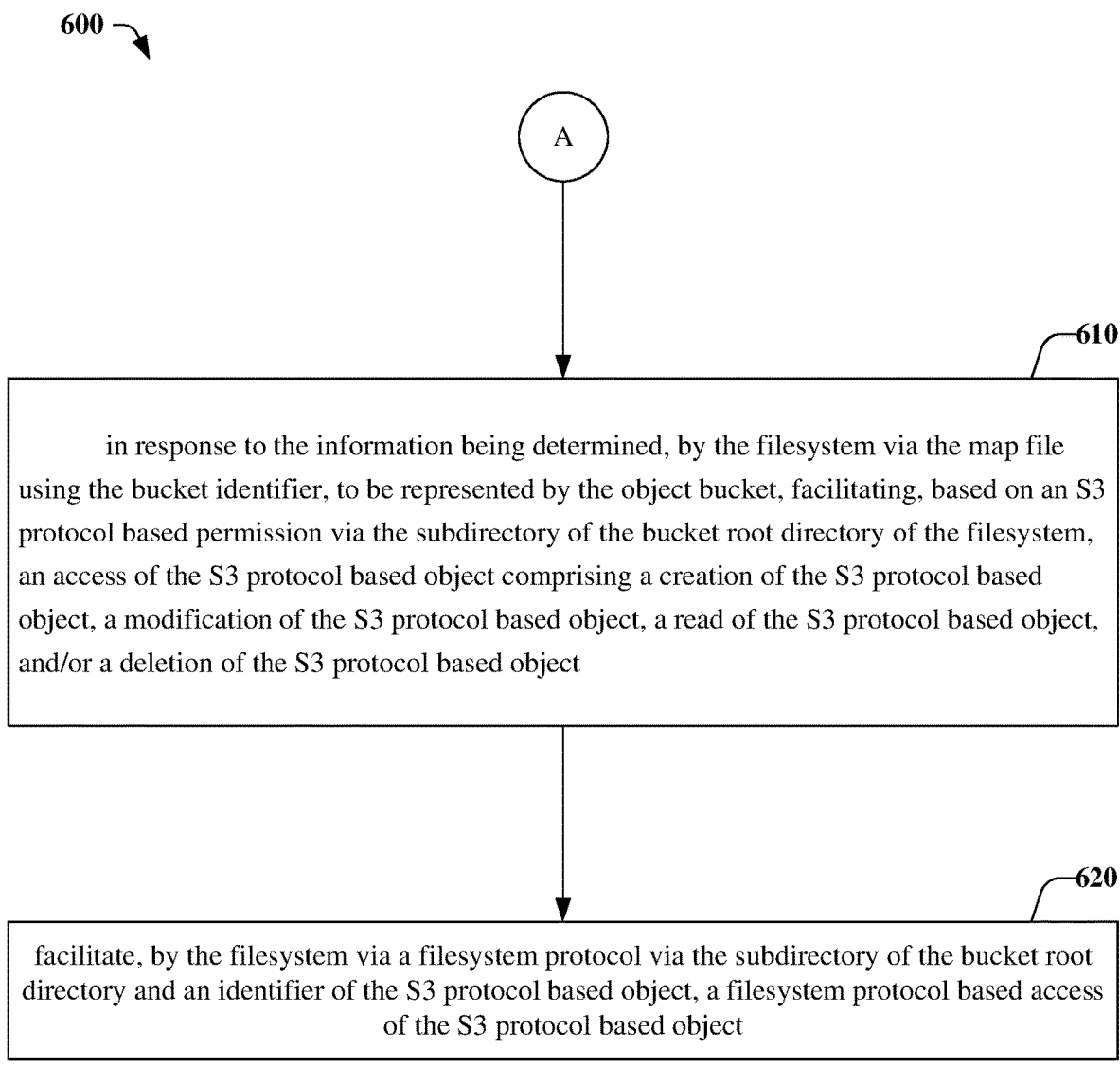
FIG. 6 illustrates a flow chart of a method that facilitates, via a map file using a bucket identifier, an S3 protocol based access of an S3 protocol based object that has been stored in a storage device of a filesystem, and that facilitates, via a filesystem protocol, a filesystem protocol based access of the S3 protocol based object, in accordance with various example embodiments.

FIG. 6 illustrates a flow chart (600) of a method that facilitates, via the map file using the bucket identifier, an S3 protocol based access of the S3 protocol based object that has been stored in the storage device of the filesystem; and that facilitates, via a filesystem protocol, a filesystem protocol based access of the S3 protocol based object, in accordance with various example embodiments.

At 610, in response to the information being determined, by the filesystem via the map file using the bucket identifier, to be represented by the object bucket, the filesystem facilitates, based on an S3 protocol based permission via the subdirectory of the bucket root directory of the filesystem, an access of the S3 protocol based object comprising a creation of the S3 protocol based object, a modification of the S3 protocol based object, a read of the S3 protocol based object, and/or a deletion of the S3 protocol based object.

At 620, the filesystem facilitates, via a filesystem protocol via the subdirectory of the bucket root directory and an identifier of the S3 protocol based object, a filesystem protocol based access of the S3 protocol based object.

Figure 7:
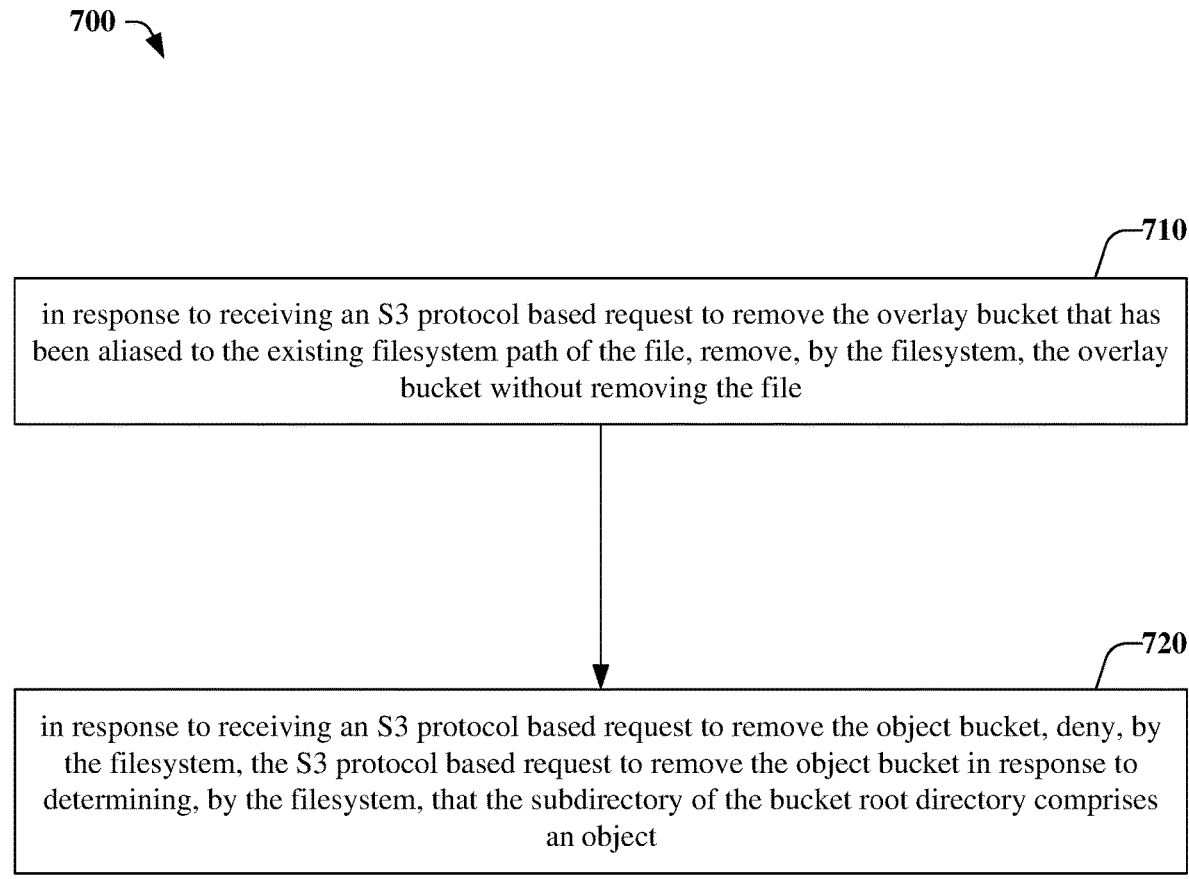
FIG. 7 illustrates a flow chart of a method corresponding to requests to remove an overlay bucket and an object bucket, in accordance with various example embodiments.

FIG. 7 illustrates a flow chart (700) of a method corresponding to requests to remove an overlay bucket and an object bucket, in accordance with various example embodiments. At 710, in response to receiving an S3 protocol based request to remove the overlay bucket that has been aliased to the existing filesystem path of the file, the filesystem removes the overlay bucket without removing the file.

At 720, in response to receiving an S3 protocol based request to remove the object bucket, the file system denies the S3 protocol based request to remove the object bucket in response to determining that the subdirectory of the bucket root directory comprises an object, S3 protocol based object, etc.

Figure 8:
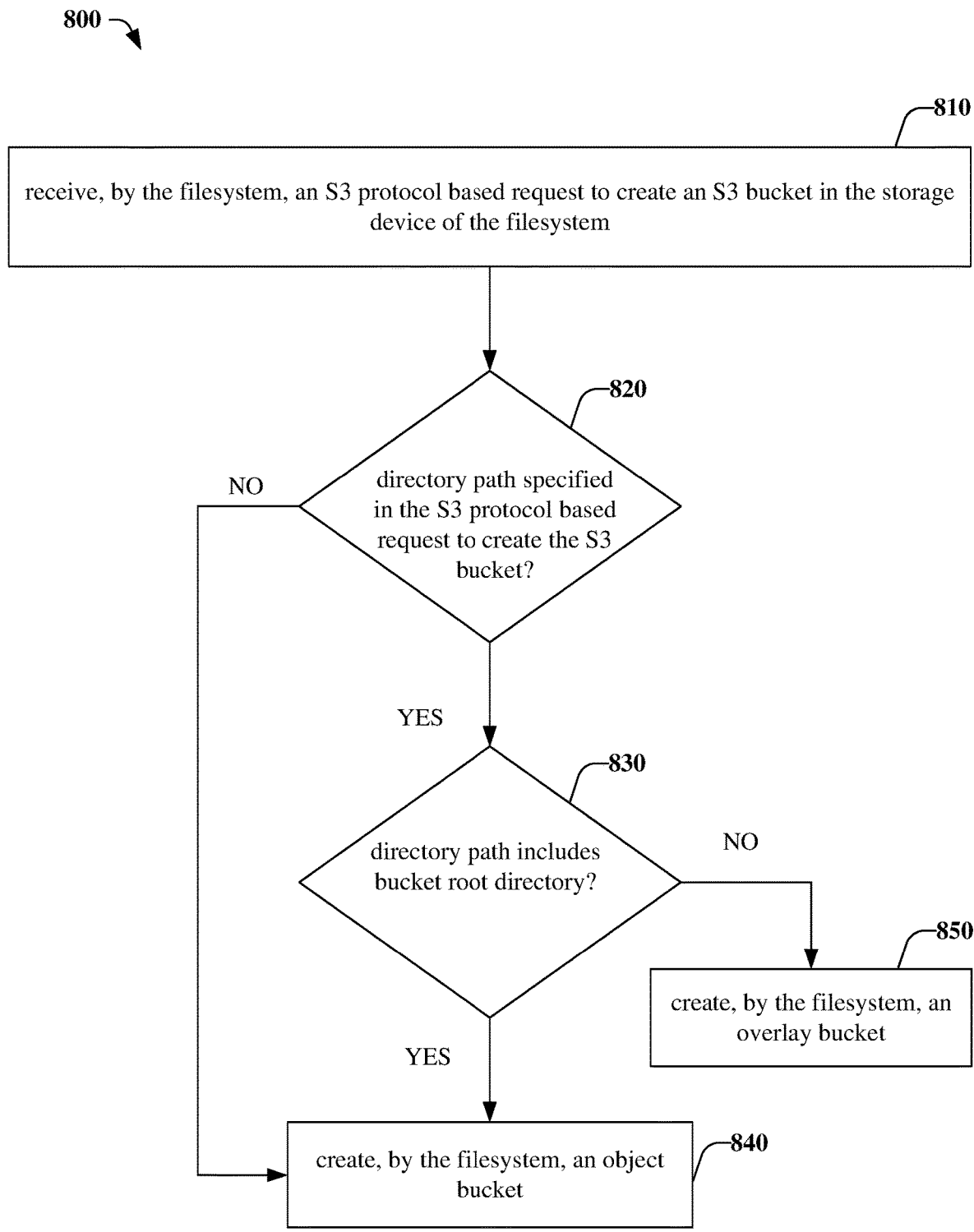
FIG. 8 illustrates a flow chart of a method corresponding to creation of an object bucket and an overlay bucket, in accordance with various example embodiments.

FIG. 8 illustrates a flow chart (800) of a method corresponding to creation of an object bucket and an overlay bucket, in accordance with various example embodiments. At 810, the filesystem receives an S3 protocol based request to create an S3 bucket in the storage device of the filesystem. At 820, in response to a determination, by the filesystem, that a directory path is specified in the S3 protocol based request to create the S3 bucket, flow continues to 830, at which the filesystem determines whether the directory path includes a bucket root directory of the filesystem; otherwise, flow continues to 840, at which the filesystem creates an object bucket.

At 830, in response to a determination that the directory path includes the bucket root directory, flow continues to 840, at which the filesystem creates the object bucket; otherwise flow continues to 850, at which the filesystem creates an overlay bucket.

Reference throughout this specification to "one embodiment," or "an embodiment," means that a particular feature, structure, or characteristic described in connection with the embodiment is included in at least one embodiment. Thus, the appearances of the phrase "in one embodiment," or "in an embodiment," in various places throughout this specification are not necessarily all referring to the same embodiment. Furthermore, the particular features, structures, or characteristics may be combined in any suitable manner in one or more embodiments.

Furthermore, to the extent that the terms "includes," "has," "contains," and other similar words are used in either the detailed description or the appended claims, such terms are intended to be inclusive—in a manner similar to the term "comprising" as an open transition word—without precluding any additional or other elements. Moreover, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As utilized herein, the terms "logic", "logical", "logically", and the like are intended to refer to any information having the form of instruction signals and/or data that may be applied to direct the operation of a processor. Logic may be formed from signals stored in a device memory. Software is one example of such logic. Logic may also be comprised by digital and/or analog hardware circuits, for example, hardware circuits comprising logical AND, OR, XOR, NAND, NOR, and other logical operations. Logic may be formed from combinations of software and hardware. On a network, logic may be programmed on a server, or a complex of servers. A particular logic unit is not limited to a single logical location on the network.

As utilized herein, terms "component", "system", and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server, client, etc. and the server, client, etc. can be a component. One or more components can reside within a process, and a component can be localized on one computer and/or distributed between two or more computers.

Further, components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. In yet another example, a component can be an apparatus that provides specific functionality through electronic components without mechanical parts; the electronic components can comprise one or more processors therein to execute software and/or firmware that confer(s), at least in part, the functionality of the electronic components.

Aspects of systems, apparatus, and processes explained herein can constitute machine-executable instructions embodied within a machine, e.g., embodied in a computer readable medium (or media) associated with the machine. Such instructions, when executed by the machine, can cause the machine to perform the operations described. Additionally, the systems, processes, process blocks, etc. can be embodied within hardware, such as an application specific integrated circuit (ASIC) or the like. Moreover, the order in which some or all of the process blocks appear in each process should not be deemed limiting. Rather, it should be understood by a person of ordinary skill in the art having the benefit of the instant disclosure that some of the process blocks can be executed in a variety of orders not illustrated.

Furthermore, the word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art having the benefit of the instant disclosure.

The disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can comprise, but are not limited to: random access memory (RAM); read only memory (ROM); electrically erasable programmable read only memory (EEPROM); flash memory or other memory technology (e.g., card, stick, key drive, thumb drive, smart card); solid state drive (SSD) or other solid-state storage technology; optical disk storage (e.g., compact disk (CD) read only memory (CD ROM), digital video/versatile disk (DVD), Blu-ray disc); cloud-based (e.g., Internet based) storage; magnetic storage (e.g., magnetic cassettes, magnetic tape, magnetic disk storage or other magnetic storage devices); a virtual device that emulates a storage device and/or any of the above computer-readable media; or other tangible and/or non-transitory media which can be used to store desired information. In this regard, the terms "tangible" or "non-transitory" herein as applied to storage, memory, or computer-readable media, are to be understood to exclude only propagating transitory signals per se as modifiers and do not relinquish rights to all standard storage, memory or computer-readable media that are not only propagating transitory signals per se.

As it is employed in the subject specification, the term "processor", "processing component", etc. can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions and/or processes described herein. Processors can exploit nanoscale architectures such as, but not limited to, molecular and quantum-dot based transistors, switches and gates, in order to optimize space usage or enhance performance of mobile devices. A processor may also be implemented as a combination of computing processing units.

In the subject specification, terms such as "data store", "data storage", "storage device", "storage medium", "memory component", and substantially any other information storage component relevant to operation and functionality of a system, component, and/or process, can refer to "memory components," or entities embodied in a "memory," or components comprising the memory. It will be appreciated that the memory components described herein can be either volatile memory or nonvolatile memory, or can comprise both volatile and nonvolatile memory.

By way of illustration, and not limitation, nonvolatile memory, for example, can be included in a node, a storage node, a data storage node, etc. (e.g., 920, 922), storage devices (e.g., 102, 940, 942), non-volatile memory 1022 (see below), disk storage 1024 (see below), and/or memory storage 1046 (see below). Further, nonvolatile memory can be included in read only memory (ROM), programmable ROM (PROM), electrically programmable ROM (EPROM), electrically erasable ROM (EEPROM), or flash memory. Volatile memory (e.g., 1020) can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Figure 10:
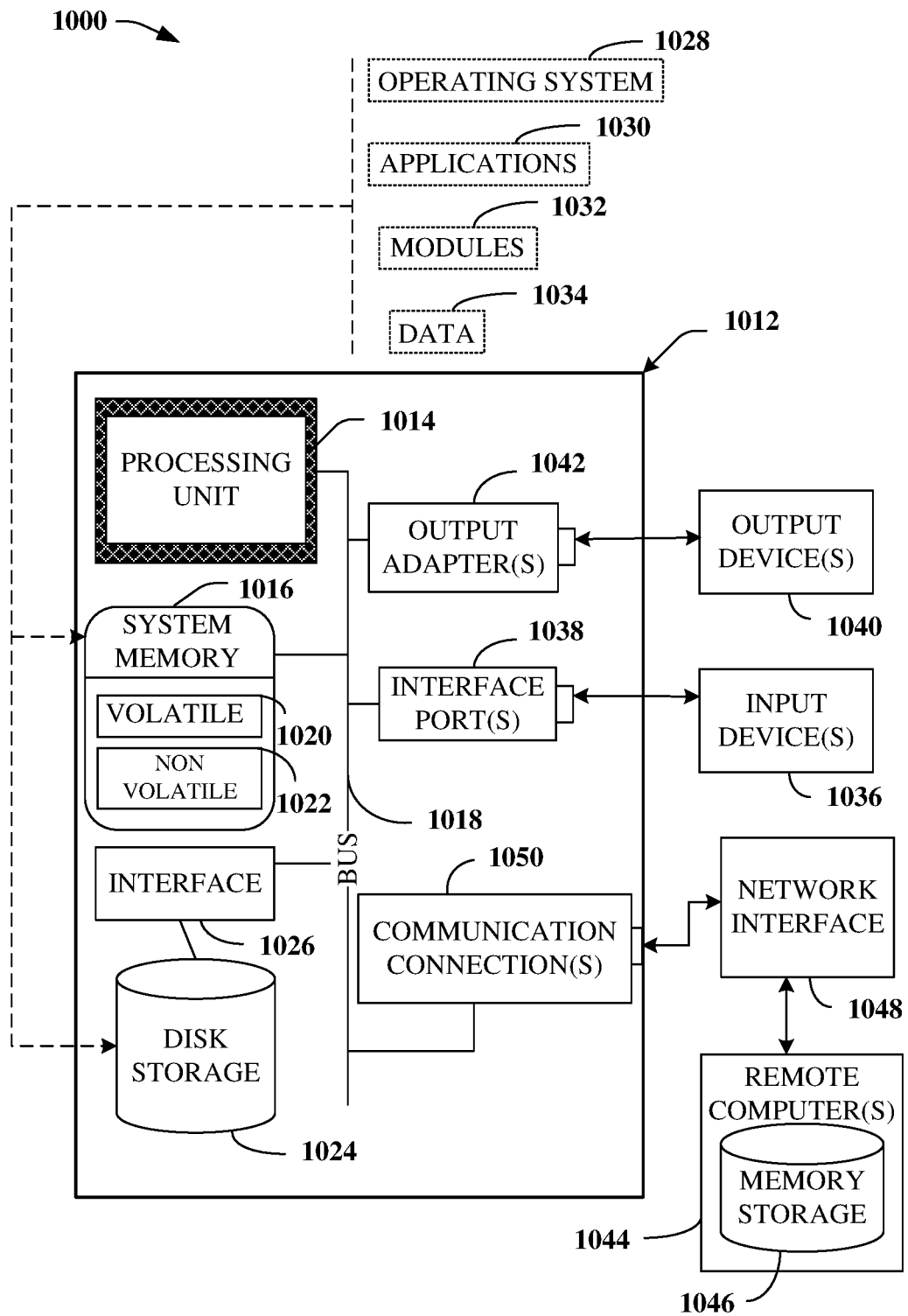
FIG. 10 illustrates a block diagram representing an illustrative non-limiting computing system or operating environment in which one or more aspects of various embodiments described herein can be implemented.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that various embodiments disclosed herein can be implemented in combination with other program modules. Generally, program modules comprise routines, programs, components, data structures, etc. that perform particular tasks and/or implement particular abstract data types.

Moreover, those skilled in the art will appreciate that the inventive systems can be practiced with other computer system configurations, comprising single-processor or multiprocessor computer systems, computing devices, mini-computing devices, mainframe computers, as well as personal computers, hand-held computing devices (e.g., PDA, phone, watch), microprocessor-based or programmable consumer or industrial electronics, and the like. The illustrated aspects can also be practiced in distributed computing environments where tasks are performed by remote processing devices that are linked through a communication network; however, some if not all aspects of the subject disclosure can be practiced on stand-alone computers. In a distributed computing environment, program modules can be located in both local and remote memory storage devices.

With reference to FIG. 10, a block diagram of a computing system 1000, e.g., 100, operable to execute the disclosed systems and methods is illustrated, in accordance with an embodiment. Computer 1012 comprises a processing unit 1014, a system memory 1016, and a system bus 1018. System bus 1018 couples system components comprising, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) comprising a memory bus or a memory controller, a peripheral bus or an external bus, and/or a local bus using any variety of available bus architectures comprising, but not limited to, industrial standard architecture (ISA), micro-channel architecture (MSA), extended ISA (EISA), intelligent drive electronics (IDE), VESA local bus (VLB), peripheral component interconnect (PCI), card bus, universal serial bus (USB), advanced graphics port (AGP), personal computer memory card international association bus (PCMCIA), Firewire (IEEE 1394), small computer systems interface (SCSI), and/or controller area network (CAN) bus used in vehicles.

System memory 1016 comprises volatile memory 1020 and nonvolatile memory 1022. A basic input/output system (BIOS), containing routines to transfer information between elements within computer 1012, such as during start-up, can be stored in nonvolatile memory 1022. By way of illustration, and not limitation, nonvolatile memory 1022 can comprise ROM, PROM, EPROM, EEPROM, or flash memory. Volatile memory 1020 comprises RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1012 also comprises removable/non-removable, volatile/non-volatile computer storage media. FIG. 10 illustrates, for example, disk storage 1024. Disk storage 1024 comprises, but is not limited to, devices like a magnetic disk drive, floppy disk drive, tape drive, Jaz drive, Zip drive, LS-100 drive, flash memory card, or memory stick. In addition, disk storage 1024 can comprise storage media separately or in combination with other storage media comprising, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to system bus 1018, a removable or non-removable interface is typically used, such as interface 1026.

It is to be appreciated that FIG. 10 describes software that acts as an intermediary between users and computer resources described in suitable operating environment 1000. Such software comprises an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be appreciated that the disclosed subject matter can be implemented with various operating systems or combinations of operating systems.

A user can enter commands or information into computer 1012 through input device(s) 1036. Input devices 1036 comprise, but are not limited to, a pointing device such as a mouse, trackball, stylus, touch pad, keyboard, microphone, joystick, game pad, satellite dish, scanner, TV tuner card, digital camera, digital video camera, web camera, cellular phone, user equipment, smartphone, and the like. These and other input devices connect to processing unit 1014 through system bus 1018 via interface port(s) 1038. Interface port(s) 1038 comprise, for example, a serial port, a parallel port, a game port, a universal serial bus (USB), a wireless based port, e.g., Wi-Fi, Bluetooth, etc. Output device(s) 1040 use some of the same type of ports as input device(s) 1036.

Thus, for example, a USB port can be used to provide input to computer 1012 and to output information from computer 1012 to an output device 1040. Output adapter 1042 is provided to illustrate that there are some output devices 1040, like display devices, light projection devices, monitors, speakers, and printers, among other output devices 1040, which use special adapters. Output adapters 1042 comprise, by way of illustration and not limitation, video and sound devices, cards, etc. that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, a workstation, a microprocessor based appliance, a peer device, or other common network node and the like, and typically comprises many or all of the elements described relative to computer 1012.

For purposes of brevity, only a memory storage device 1046 is illustrated with remote computer(s) 1044. Remote computer(s) 1044 is logically connected to computer 1012 through a network interface 1048 and then physically and/or wirelessly connected via communication connection 1050. Network interface 1048 encompasses wire and/or wireless communication networks such as local-area networks (LAN) and wide-area networks (WAN). LAN technologies comprise fiber distributed data interface (FDDI), copper distributed data interface (CDDI), Ethernet, token ring and the like. WAN technologies comprise, but are not limited to, point-to-point links, circuit switching networks like integrated services digital networks (ISDN) and variations thereon, packet switching networks, and digital subscriber lines (DSL).

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can comprise, for example, internal and external technologies such as modems, comprising regular telephone grade modems, cable modems and DSL modems, wireless modems, ISDN adapters, and Ethernet cards.

The computer 1012 can operate in a networked environment using logical connections via wired and/or wireless communications to one or more remote computers, cellular based devices, user equipment, smartphones, or other computing devices, such as workstations, server computers, routers, personal computers, portable computers, microprocessor-based entertainment appliances, peer devices or other common network nodes, etc. The computer 1012 can connect to other devices/networks by way of antenna, port, network interface adaptor, wireless access point, modem, and/or the like.

The computer 1012 is operable to communicate with any wireless devices or entities operatively disposed in wireless communication, e.g., a printer, scanner, desktop and/or portable computer, portable data assistant, communications satellite, user equipment, cellular base device, smartphone, any piece of equipment or location associated with a wirelessly detectable tag (e.g., scanner, a kiosk, news stand, restroom), and telephone. This comprises at least Wi-Fi and Bluetooth wireless technologies. Thus, the communication can be a predefined structure as with a conventional network or simply an ad hoc communication between at least two devices.

Wi-Fi allows connection to the Internet from a desired location (e.g., a vehicle, couch at home, a bed in a hotel room, or a conference room at work, etc.) without wires. Wi-Fi is a wireless technology similar to that used in a cell phone that enables such devices, e.g., mobile phones, computers, etc., to send and receive data indoors and out, anywhere within the range of a base station. Wi-Fi networks use radio technologies called IEEE 802.11 (a, b, g, etc.) to provide secure, reliable, fast wireless connectivity. A Wi-Fi network can be used to connect communication devices (e.g., mobile phones, computers, etc.) to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:
a processor; and
a memory that stores executable components that, when executed by the processor, facilitate performance of operations by the system, the operations comprising:
receiving a first simple storage system (S3) protocol based request to create an S3 bucket in a storage device of a filesystem;
in response to the first S3 protocol based request being determined to specify a directory path of an existing directory of the storage device of the filesystem, and further in response to the directory path being determined not to include a bucket root directory of the filesystem, creating, within the filesystem, an overlay bucket that references the directory path of the existing directory of the storage device of the filesystem;
in response to receiving a second S3 protocol based request to access data that has been stored in the storage device of the filesystem, determining whether the data has been referenced by an object bucket or the overlay bucket, wherein the object bucket has been created in a subdirectory of the bucket root directory of the storage device of the filesystem, and wherein the subdirectory comprises an S3 protocol based object; and
in response to determining that the data has been referenced by the overlay bucket, granting, based on an S3 protocol based permission and a filesystem protocol based permission, the second S3 protocol based request to access the data that has been stored in the storage device of the filesystem.

2. The system of claim 1, wherein the directory path comprises a first file that comprises the data, and wherein the S3 protocol based request comprises a file request to create a second file within the storage device of the filesystem, read the second file within the storage device of the filesystem, write the second file within the storage device of the filesystem, or delete the second file within the storage device of the filesystem.

3. The system of claim 1, wherein the S3 protocol based request comprises an object request to create an object within the storage device of the file system, modify the object within the storage device of the filesystem, read the object within the storage device of the filesystem, or delete the object within the storage device of the filesystem.

4. The system of claim 1, wherein the directory path is a first directory path, wherein the S3 protocol based request specifies a bucket identifier that references a second directory path of a location of the S3 bucket within the storage device of the filesystem, and wherein the determining whether the data has been referenced by the object bucket or the overlay bucket comprises:
determining, based on the bucket identifier via a map file, whether the data is referenced via the object bucket or the overlay bucket, wherein the S3 protocol based object comprises the data, and wherein the map file designates, via the bucket identifier, the second directory path of the location of the S3 bucket within the storage device of the filesystem.

5. The system of claim 1, wherein the access is a first S3 protocol based access, and wherein the first S3 protocol based request comprises a pseudo object that references the directory path of the existing directory to facilitate a second S3 protocol based access, via the pseudo object, of a file.

6. The system of claim 5, wherein the file comprises the data.

7. The system of claim 5, wherein the access comprises a removal of the overlay bucket, and in response to the removal of the overlay bucket, no files comprising the file are removed from the storage device of the filesystem.

8. The system of claim 1, wherein the S3 protocol based object comprises the data.

9. The system of claim 8, wherein the operations further comprise:
in response to determining that the data has been referenced by the object bucket, facilitating an object access of the S3 protocol based object based only on the S3 protocol based permission without consideration of any filesystem based permission.

10. The system of claim 9, wherein the access comprises a removal of the object bucket, and wherein the removal of the object bucket is denied in response to a determination that the subdirectory of the bucket root directory comprises an object.

11. The system of claim 8, wherein the S3 protocol based object is accessible, via a filesystem protocol, via the bucket root directory and an identifier of the S3 protocol based object.

12. A method, comprising:
receiving, by a filesystem comprising a processor, a first simple storage system (S3) protocol based request to create an S3 bucket in a storage device of a filesystem;
determining, by the filesystem, whether the first S3 protocol based request specifies a directory path of an existing directory of the storage device of the filesystem;
in response to determining that the first S3 protocol based request specifies the directory path of the existing directory of the storage device of the filesystem, determining, by the filesystem, whether the directory path includes a bucket root directory of the filesystem;
in response to determining that the directory path does not to include the bucket root directory of the filesystem, creating, by the filesystem, an overlay bucket that references the directory path of the existing directory of the storage device of the filesystem;
receiving, by the filesystem, a second S3 protocol based request to access information that has been stored within the directory path of the existing directory of the storage device of the filesystem;
determining, by the filesystem, whether the information has been referenced by an object bucket or the overlay bucket, wherein the object bucket has been created in a subdirectory of the bucket root directory of the storage device of the filesystem, and wherein the subdirectory comprises an S3 protocol based object; and
in response to determining that the information has been referenced by the overlay bucket, facilitating, by the filesystem based on an S3 protocol based permission and a filesystem protocol based permission, the access of the information that has been stored within the directory path of the existing directory of the storage device of the filesystem.

13. The method of claim 12, wherein the determining of whether the information has been referenced by the object bucket or the overlay bucket comprises:
generating a map file representing, via a bucket identifier, whether the information has been represented by the overlay bucket or the object bucket; and referencing, via the bucket identifier, the subdirectory of the bucket root directory, wherein the S3 protocol based object comprises the information.

14. The method of claim 13, wherein the overlay bucket has been aliased to an existing filesystem path of a file comprising the information, and wherein the facilitating of the access of the information comprises:

in response to determining, via the map file using the bucket identifier, that the information is represented by the overlay bucket, facilitating, via a pseudo object identifier that has been included in the second S3 protocol based request and that references the existing filesystem path of the file, a file access of the file, wherein the file access comprises at least one of a write of the file, a read of the file, or a deletion of the file.

15. The method of claim 13, wherein the facilitating of the access of the information comprises:

in response to determining, via the map file using the bucket identifier, that the information is represented by the object bucket, facilitating, based on the S3 protocol based permission via the subdirectory of the bucket root directory of the filesystem, an object access of the S3 protocol based object, wherein the object access comprises at least one of a creation of the S3 protocol based object, a modification of the S3 protocol based object, a read of the S3 protocol based object, or a deletion of the S3 protocol based object.

16. The method of claim 15, wherein operations further comprise:

facilitating, by the filesystem via a filesystem protocol via the subdirectory of the bucket root directory and an identifier of the S3 protocol based object, a filesystem protocol based access of the S3 protocol based object.

17. A non-transitory machine-readable medium comprising instructions that, in response to execution, cause a system comprising a processor to perform operations, the operations comprising:

receiving, via a simple storage system (S3) protocol, a first request to create an S3 bucket in a storage device of a filesystem;

in response to determining that the first request specifies a directory path of an existing directory of the storage device of the filesystem, and further in response to determining that the directory path does not include a bucket root directory of the filesystem, creating, in the filesystem, an overlay bucket that references the directory path of the existing directory of the storage device;

receiving, via the S3 protocol, a second request to access data of the filesystem;

determining whether the data has been referenced by an object bucket or the overlay bucket, wherein the object bucket has been created in a subdirectory of the bucket root directory of the filesystem, and wherein the subdirectory comprises an S3 protocol based object; and in response to determining that the data has been referenced by the overlay bucket, facilitating the access of the filesystem, wherein the facilitating comprises based on an S3 protocol based permission and further based on a filesystem protocol based permission of the filesystem, facilitating the access via the overlay bucket, wherein the directory path references a file comprising the data.

18. The non-transitory machine-readable medium of claim 17, wherein the determining comprises:

determining whether the data has been referenced by the object bucket or the overlay bucket utilizing a data structure representing directories of the filesystem where respective data comprising the data are located and representing whether the data has been referenced by the object bucket or the overlay bucket, wherein the overlay bucket comprises a pseudo object identifier that references the existing directory of the storage device.

19. The non-transitory machine-readable medium of claim 17, wherein the operations further comprise:

facilitating an object access of the S3 protocol based object via the object bucket based on the S3 protocol based permission, without consideration of any filesystem protocol based permissions of the filesystem.

20. The non-transitory machine-readable medium of claim 18, wherein operations further comprise:

facilitating, via a filesystem protocol via the subdirectory of the bucket root directory and an identifier of the S3 protocol based object, a filesystem protocol based access of the S3 protocol based object.

* * * * *